US011343557B2

(12) United States Patent
Sugimura et al.

(10) Patent No.: US 11,343,557 B2
(45) Date of Patent: May 24, 2022

(54) ENTERTAINMENT SYSTEM AND PROGRAM

(71) Applicant: TOYOTA JIDOSHA KABUSHIKI KAISHA, Toyota (JP)

(72) Inventors: Tae Sugimura, Miyoshi (JP); Hirotaka Karube, Toyota (JP); Kazuki Matsumoto, Ohgaki (JP); Makoto Mori, Nagakute (JP); Jun Kondo, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/567,293

(22) Filed: Sep. 11, 2019

(65) Prior Publication Data

US 2020/0120376 A1  Apr. 16, 2020

(30) Foreign Application Priority Data

Oct. 12, 2018  (JP) .............................. JP2018-193750

(51) Int. Cl.
*H04N 21/414*  (2011.01)
*H04N 21/45*  (2011.01)

(52) U.S. Cl.
CPC ... *H04N 21/41422* (2013.01); *H04N 21/4524* (2013.01)

(58) Field of Classification Search
CPC .................... H04N 21/41422; H04N 21/4524
See application file for complete search history.

(56) References Cited

U.S. PATENT DOCUMENTS

| 2007/0116299 | A1* | 5/2007 | Vanderwall | ........ H04N 21/4532 381/86 |
| 2010/0053029 | A1* | 3/2010 | Wilzbach | ............... A63G 25/00 345/2.3 |
| 2012/0327315 | A1* | 12/2012 | Larsen | ................. H04N 5/7475 348/745 |
| 2019/0107845 | A1* | 4/2019 | Kaine | .................. G05D 1/0022 |
| 2020/0164522 | A1* | 5/2020 | Sohn | .................... G10H 1/0083 |

FOREIGN PATENT DOCUMENTS

| CN | 206258735 U | 6/2017 |
| JP | 2007-286741 A | 11/2007 |
| JP | 2009-106777 A | 5/2009 |

* cited by examiner

*Primary Examiner* — Yassin Alata
(74) *Attorney, Agent, or Firm* — Oliff PLC

(57) ABSTRACT

An entertainment system according to one embodiment of the present disclosure includes a plurality of mobile units each of which has an output device for outputting a video and/or a sound of content, an arrangement control unit configured to control an arrangement of the plurality of mobile unit, and an output control unit configured to control the video and/or the sound of the content, which is output from each of the plurality of mobile units, based on the arrangement of the plurality of mobile units.

9 Claims, 7 Drawing Sheets

ENTERTAINMENT SYSTEM AND PROGRAM

INCORPORATION BY REFERENCE

The disclosure of Japanese Patent Application No. 2018-193750 filed on Oct. 12, 2018 including the specification, drawings and abstract is incorporated herein by reference in its entirety.

BACKGROUND

1. Technical Field

The present disclosure relates to an entertainment system and a program.

2. Description of Related Art

Conventionally, a system is known that is installed in indoor and outdoor spaces, such as an event site and an amusement park (playground), for providing various attractions and amusement. For example, in Japanese Patent Application Publication No. 2009-106777 (JP 2009-106777 A), an attraction system is proposed in which the size of a theater for providing videos can be changed between a plurality of booths and a combined theater that combines the plurality of booths.

SUMMARY

In a conventional attraction system, especially, in an attraction system for providing videos, there is a general tendency that the equipment and the system itself grow in size and complexity in order to accommodate a relatively large audience and to increase audience's interest and realistic sensation. However, such a relatively large attraction is not suitable for offering for a short period, in a small space, at a remote location, or for touring and is low in mobility. In addition, much labor and effort are required for loading and unloading the equipment and for setting up the system and, in many cases, it is difficult to secure a large-capacity power source.

In view of such circumstances, one aspect the present disclosure is to provide an entertainment system that can be constructed simply and flexibly, that is not subject to installation restrictions such as an installation place and an installation period, that is easy to secure a power source, and that is highly versatile and to provide a program that implements such an entertainment system.

An entertainment system in one embodiment of the present disclosure includes a plurality of mobile units each of which has an output device for outputting a video and/or a sound of content, an arrangement control unit configured to control an arrangement of the plurality of mobile units, and an output control unit configured to control the video and/or the sound of the content, which is output from each of the plurality of mobile units, based on the arrangement of the plurality of mobile units.

A program in one embodiment of the present disclosure causes an information processing device to control an arrangement of a plurality of mobile units each of which has an output device for outputting a video and/or a sound of content and to control the video and/or the sound of the content that is output from each of the plurality of mobile units based on the arrangement of the plurality of mobile units.

According to the technique of the present disclosure, the arrangement control unit controls the arrangement of a plurality of mobile units each of which has an output device for outputting the video and/or the sound of content and the output control unit controls the video and/or the sound of the content that is output from each mobile unit based on the arrangement of the plurality of mobile units. As a result, an entertainment system is configured that reproduces and delivers the content for provision to the users (audience). In providing the content in this way, the use of small vehicles, such as inverted mobile units or personal mobile units, as mobile units allows the system to be simply and flexibly constructed. In addition, the use of the battery provided in each of the mobile units, such as small vehicles, as the power supply of the input/output device, allows the power supply to be secured easily. As a result, it is possible to implement an entertainment system that is versatile and is not easily subject to the installation restrictions such as the installation place and the installation period.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
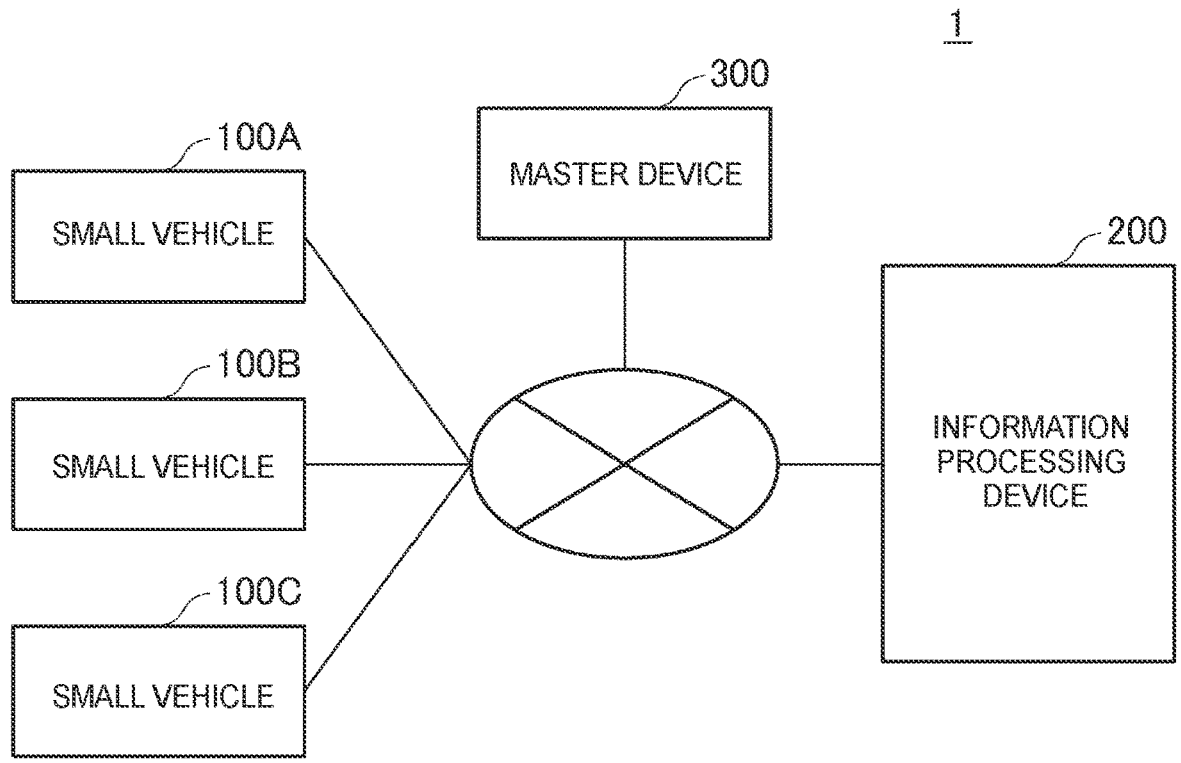
FIG. 1 is a diagram showing a general configuration of an entertainment system 1 according to this embodiment.

An embodiment of the present disclosure will be described in detail below with reference to the drawings. In the description below, the same reference numeral indicates the same component and redundant description will be omitted. Note that the embodiment described below is an example and various modifications can be made without departing from the spirit of the disclosure. Also note that the drawings include schematic or conceptual drawings and therefore do not necessarily correspond to actual dimensions and ratios and that the dimensions or ratios of the same or similar components may differ from one drawing to another.

In this embodiment, the arrangement of a plurality of mobile units, each having a device for outputting the video and/or sound of content, is controlled. Based on this arrangement, the video and/or the sound of content output from the plurality of mobile units are reproduced and delivered for provision to the users (audience). For example, when the content is a piece of work that includes a video and a sound, this embodiment makes it possible to simply implement an entertainment system as the so-called mini-theater without being subject to installation condition restrictions.

FIG. 1 is a diagram showing a general configuration of an entertainment system 1 according to this embodiment. As shown in FIG. 1, the entertainment system 1 includes a small vehicle 100A, a small vehicle 100B, a small vehicle 100C, an information processing device 200, and a master device 300. All or a part of these vehicles and devices are connected via a communication network so that they can communicate with each other. The communication network may be the Internet, a LAN, a mobile communication network, a Bluetooth (registered trademark) network, a WiFi (Wireless Fidelity) network, any of other communication lines, or a combination of these networks and lines. Note that the number of small vehicles 100A to 100C (for example, personal mobility vehicles), information processing devices 200 (for example, server), and master devices 300 is not limited to that shown in the example. A required number of small vehicles 100A to 100C, information processing devices 200, and master devices 300 may be provided as necessary according to the size of the entertainment system 1. In the description below, the small vehicles 100A to 100C are simply referred to as the "small vehicle 100" when they are collectively described without being separately distinguished. As described above, the small vehicle 100 (small vehicles 100A to 100C) corresponds to an example of a "mobile unit" in the present disclosure.

Figure 2:
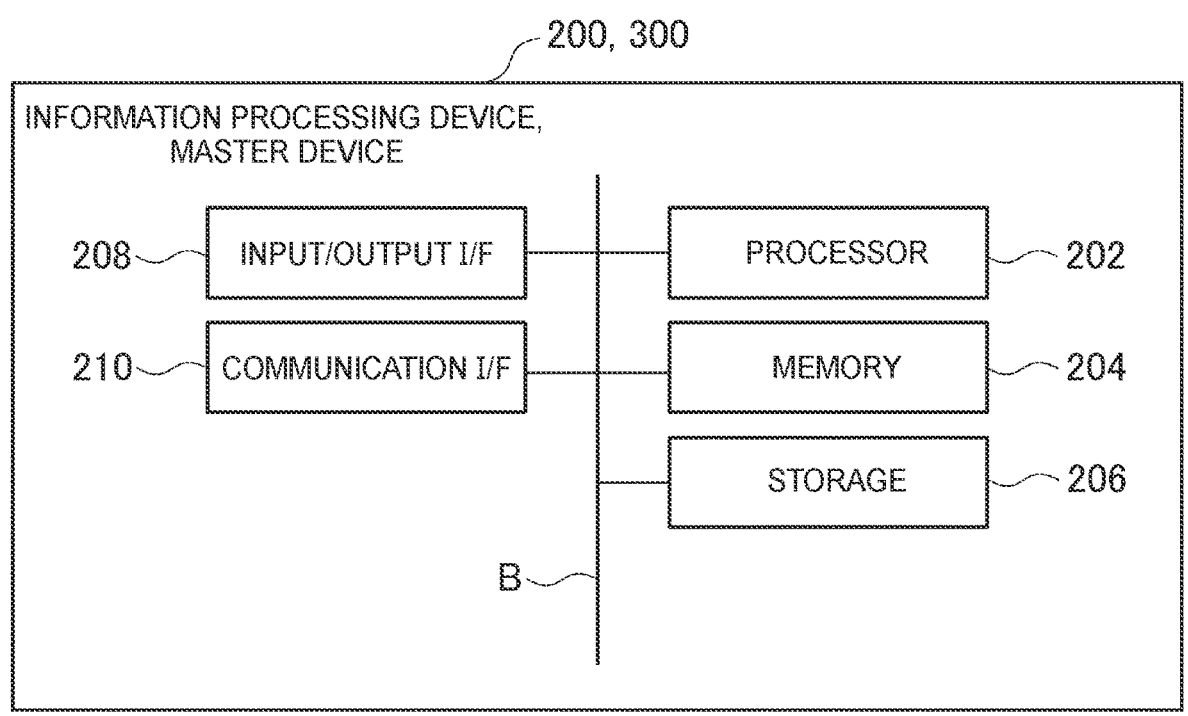
FIG. 2 is a diagram showing an example of a hardware configuration of an information processing device 200 and a master device 300 according to this embodiment.

FIG. 2 is a diagram showing an example of a hardware configuration of the information processing device 200 and the master device 300 according to this embodiment. As shown in FIG. 2, each of the information processing device 200 and the master device 300 includes a processor 202, a memory 204, a storage 206, an input/output interface (input/output I/F) 208, and a communication interface (communication I/F) 210. The hardware components of the information processing device 200 are connected to one another via a bus B. The information processing device 200 implements the functions and/or methods described in this embodiment by the cooperation of the processor 202, memory 204, storage 206, input/output I/F 208, and the communication I/F 210.

The processor 202 executes functions and/or methods implemented by code or instructions included in the programs stored in the storage 206. The processor 202 is, for example, a central processing unit (CPU), a micro processing unit (MPU), a GPU, a microprocessor, a processor core, a multiprocessor, an application-specific integrated circuit (ASIC), a field programmable gate array (FPGA), and so on.

The memory 204 temporarily stores a program loaded from the storage 206 and provides a work area to the processor 202. The memory 204 also temporarily stores various types of data generated while the processor 202 executes a program. The memory 204 includes, for example, a random access memory (RAM) and a read only memory (ROM).

The storage 206 stores programs to be executed by the processor 202. The storage 206 includes, for example, a hard disk drive (HDD), a solid state drive (SSD), and a flash memory.

The input/output I/F 208 includes an input device on which various operations for each of the information processing device 200 and the master device 300 are performed and an output device on which a processing result processed by the information processing device 200 is output.

The communication I/F 210 sends and receives various types of data via the network. The communication may be carried out via cable or wirelessly. Any communication protocol may be used as long as communication can be carried out. The communication I/F 210 has a function to carry out communication among the small vehicle 100, the information processing device 200, and the master device 300 via the network. The communication I/F 210 also sends various types of data to the small vehicle 100, the information processing device 200, and the master device 300 in response to an instruction from the processor 202.

The programs for operating the entertainment system 1 in this embodiment may be provided by storing them in a computer-readable storage medium. The storage medium mentioned above is a "non-transitory tangible medium" on which the programs can be stored. The programs include the programs necessary for the operation of the entertainment system 1 and the programs necessary for the operation of the computer.

Furthermore, at least a part of processing in the information processing device 200 and the master device 300 may be implemented by cloud computing configured by one or more computers. In addition, at least a part of processing in the information processing device 200 may be performed by the master device 300 or another information processing device 200; similarly, at least a part of processing in the master device 300 may be performed by the information processing device 200 or another master device 300. In this case, at least a part of processing of each functional unit implemented by the processor 202 can be performed by an alternative device.

The master device 300 is a device that integrally controls and manages the operation of the small vehicles 100 based on a command received from the information processing device 200. In addition, the master device 300 may have a function to acquire or relay the emergency signal, which is generated and issued when a disaster occurs, and various information signals (the signal that indicates the situation of an earthquake, tsunami, typhoon, tornado, or fire, the signal that predicts the occurrence of such a situation, the signal that indicates the traffic information, etc.) and to send these signals to the small vehicles 100. In this respect, it can be said that the master device 300 functions as a hub device or a central device. One of the small vehicles 100 or one of the information processing devices 200 may function as the master device 300. In this case, one of the small vehicles 100, one of the information processing devices 200, and the master device 300 correspond to an example of the "information processing device" in this disclosure.

Figure 3:
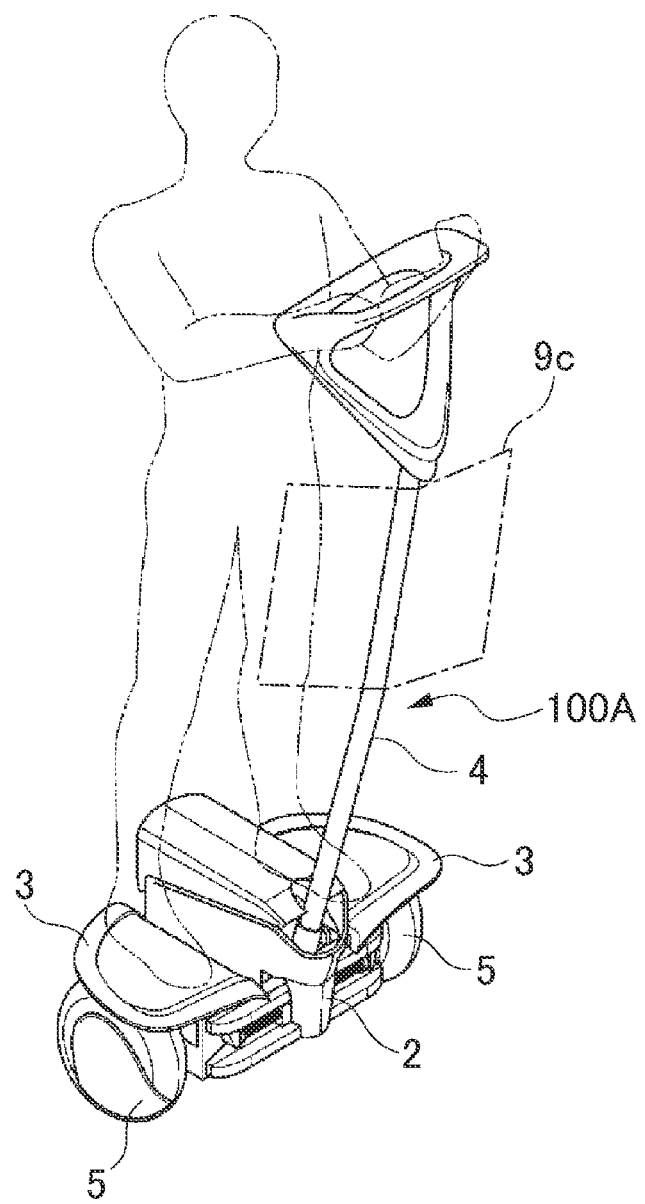
FIG. 3 is a perspective view showing a general configuration of an inverted mobile unit 100A (small vehicle 100A) as an example of a small vehicle 100 according to this embodiment.

FIG. 3 is a perspective view showing a general configuration of an inverted mobile unit 100A (small vehicle 100A) as an example of the small vehicle 100 according to this embodiment. The inverted mobile unit 100A according to this embodiment includes a vehicle body 2, a pair of left and right platforms 3 which are attached to the vehicle body 2 and on which the rider stands, a handle 4 which is attached to the vehicle body 2 in a tiltable way and is held by the rider, a pair of left and right wheels 5 which are mounted on the vehicle body 2 in a rotatable way, and an input/output interface (I/F) 9c (particularly an output device) that will be described later.

The inverted mobile unit 100A according to this embodiment is configured, for example, as a coaxial two-wheeled vehicle that, with the wheels 5 arranged coaxially, travels while maintaining the inverted state. The inverted mobile unit 100A is configured in such a way that it moves forward and backward when the rider shifts the weight forward and backward to tilt the platforms 3 of the vehicle body 2 forward and backward. The small vehicle 100A is also configured in such a way that it turns to turn left and right when the rider shifts the weight to the left and right to tilt the platforms 3 of the vehicle body 2 to the left and right. Although the above-described coaxial two-wheeled vehicle is used as the inverted mobile unit 100A in this embodiment, the present disclosure is not limited to this coaxial two-wheeled vehicle but can be applied to any mobile unit that travels while maintaining the inverted state.

Figure 4:
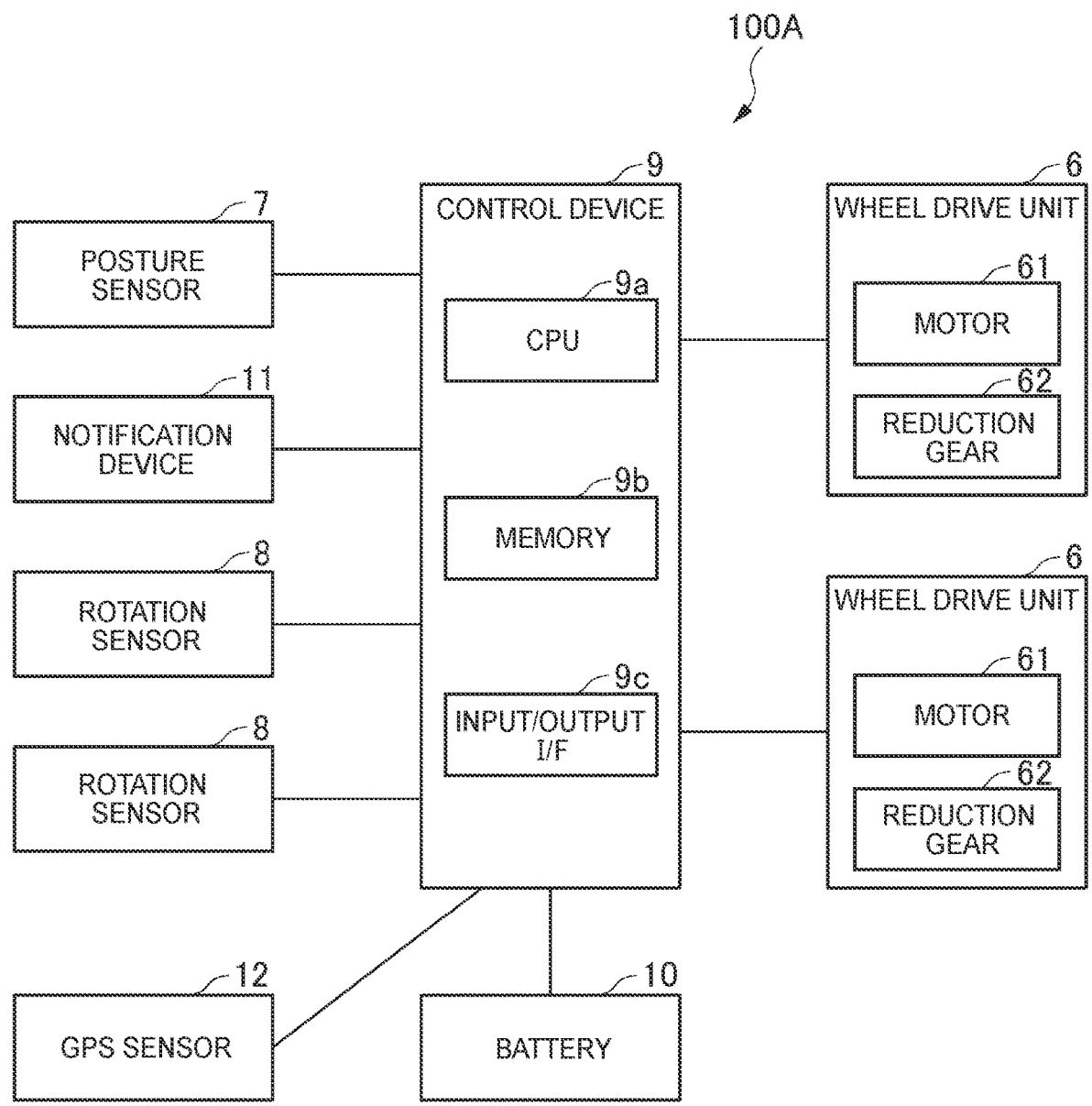
FIG. 4 is a block diagram showing a general system configuration of the inverted mobile unit 100A according to this embodiment.

FIG. 4 is a block diagram showing a general system configuration of the inverted mobile unit 100A according to this embodiment. The inverted mobile unit 100A according to this embodiment includes a pair of wheel drive units 6 that drives the wheels 5, a posture sensor 7 that detects the posture of the vehicle body 2, a pair of rotation sensors 8 that detects the rotation information on the wheels 5, a control device 9 that controls the wheel drive units 6, a battery 10 that supplies power to the wheel drive units 6 and the control device 9, a notification device 11 that can output sound, and a GPS sensor 12 that senses the position information.

The wheel drive units 6, built in the vehicle body 2, drive a pair of left and right the wheels 5 respectively. The wheel drive units 6 can independently rotate a pair of wheels 5. Each of the wheel drive units 6 can be configured, for example, by a motor 61 and a reduction gear 62 coupled to the rotation shaft of the motor 61 in such a way that power can be conveyed.

The posture sensor 7, provided in the vehicle body 2, detects and outputs the posture information on the vehicle body 2 and the handle 4. The posture sensor 7, which detects the posture information when the inverted mobile unit 100A travels, is configured, for example, by a gyro sensor and an acceleration sensor. When the rider tilts the handle 4 forward or backward, the platforms 3 tilt in the same direction. The posture sensor 7 detects the posture information corresponding to this tilt. The posture sensor 7 outputs the detected posture information to the control device 9.

The rotation sensors 8, provided one for each wheel 5, can detect the rotation information such as the rotation angle, rotation angular velocity, and rotation angular acceleration of the wheels 5. Each of the rotation sensors 8 is configured, for example, by a rotary encoder and a resolver. The rotation sensors 8 output the detected rotation information to the control device 9.

The battery 10, a power supply built in the vehicle body 2, is configured by a lithium ion storage battery or the like. The battery 10 supplies power to the wheel drive units 6, control device 9, and other electronic devices.

The control device 9 generates and outputs the control signal for controlling the driving of the wheel drive units 6, based on the detection values output from various sensors mounted on the inverted mobile unit 100A. The control device 9 executes the predetermined arithmetic processing based on the posture information output from the posture sensor 7 and the rotation information on the wheels 5 output from the rotation sensors 8 and, then, outputs the necessary control signal to the wheel drive units 6. The control device 9 controls the wheel drive units 6 to perform, for example, inversion control for maintaining the inverted state of the inverted mobile unit 100A.

The control device 9 includes a CPU 9a, a memory 9b, and the input/output I/F 9c to implement the processing described above. The CPU 9a executes the functions and/or methods implemented by code or instructions included in the programs stored in the memory 9b.

The memory 9b stores programs and provides a work area to the CPU 9a. In addition, the memory 9b temporarily stores various types of data generated while the CPU 9a executes a program. The memory 9b includes, for example, a random access memory (RAM) and a read only memory (ROM).

The input/output I/F 9c includes an input device and an output device. The input device is a device on which various types of input operation for the control device 9 are performed. The output device is a device on which the processing result processed by the control device 9 and the processing result processed by the information processing device 200 are output. In the input/output I/F 9c, the input device and the output device may be provided integrally or separately, and one or more input devices and one or more output devices may be provided. The input/output I/F 9c may be provided integrally with, or separately from, the CPU 9a or the memory 9b.

The input device is not limited to a particular device, but any of various types of device may be used as long as the device can send the input information, entered via an input operation by the rider of the inverted mobile unit 100A, to the CPU 9a. The input device may be one type of device or a combination of two or more types of devices. More specifically, the input device may be a touch panel, a touch display, a keyboard, a pointing device such as a mouse, a camera (an image input device that may also be used as a capturing device), or a microphone (a voice input device).

The output device is not limited to a particular device, but any of various types of device can be used as long as the device can output processing results produced by the control device 9 and the processing device 200. The processing results mentioned above include the video or sound of content (moving image, movie, music, other video-sound works) to be provided to the users (audience) in the entertainment system 1. The output device may be one type of device or a combination of two or more types of devices. More specifically, the output device may be a touch panel, a touch display, a monitor (liquid crystal display, organic EL display, head mounted display, hologram, projection mapping), a speaker (voice output device), a 2D printer (character output device), or a 3D printer (modeling output device). The output device may be installed on the vehicle body 2 or on the handle 4 as illustrated in the figure or may be provided independently of the vehicle body 2 or the handle 4.

The notification device 11 is an example of a unit for notification. The notification device 11 notifies the rider or a person outside the vehicle in response to the notification signal from the control device 9. The notification device 11 is configured, for example, by a speaker that outputs a sound. The input/output I/F 9c may function as a notification device 11.

The GPS sensor 12 acquires the current position information on the inverted mobile unit 100A. The GPS sensor 12 is, for example, a part of a position information measurement system that uses artificial satellites. The GPS sensor 12 receives radio waves from several GPS satellites to accurately measure a position (longitude, latitude, altitude) at any point on the earth. The inverted mobile unit 100A may be provided with a capturing device or a communication device.

Figure 5:
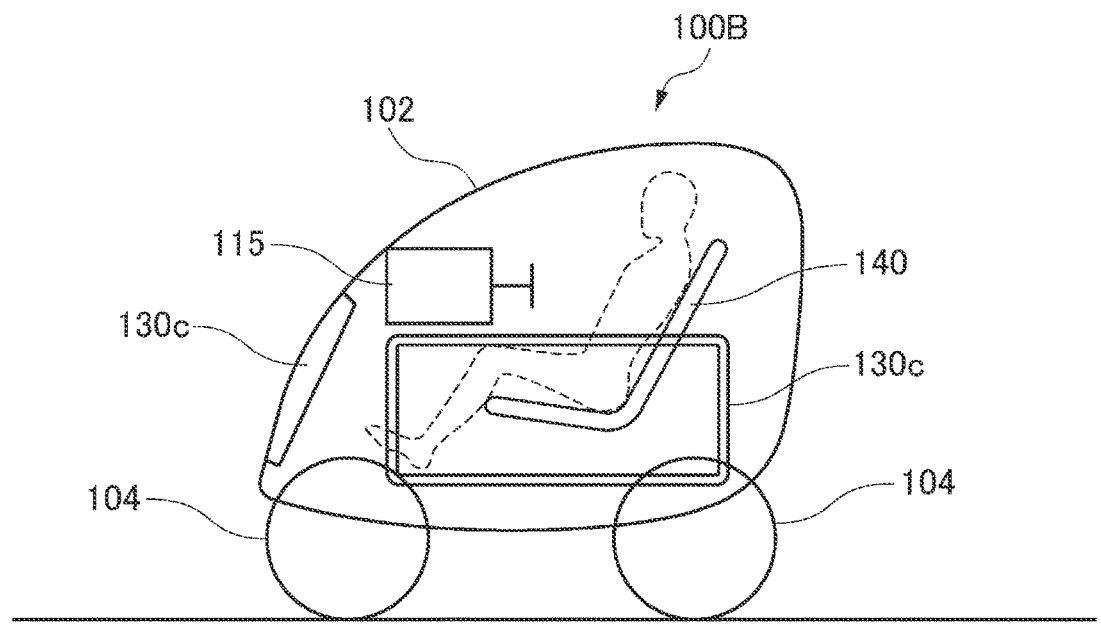
FIG. 5 is a schematic diagram showing a general configuration of a personal mobile unit 100B (small vehicle 100B) as an example of the small vehicle 100 according to this embodiment.

FIG. 5 is a schematic diagram showing a general configuration of a personal mobile unit 100B (small vehicle 100B) as an example of the small vehicle 100 according to this embodiment. The personal mobile unit 100B according to this embodiment includes, for example, a vehicle body 102, a seat unit 140 attached to the vehicle body 102 and seated by an occupant (driver), an operation unit 115 that enables the occupant to operate the personal mobile unit 100B, a pair of left and right drive wheels 104 mounted on the vehicle body 2 in a rotatable way, and an input/output interface (I/F) 130c (especially, an output device) that will be described later.

The personal mobile unit 100B according to this embodiment is, for example, a small one- or two-seater vehicle. The drive wheels 104 may be provided, two at the front and one at the rear. The personal mobile unit 100B may be driven by an occupant or may be switched to the autonomous travel mode. In the autonomous travel mode, the personal mobile unit 100B autonomously travels based on an image captured by capturing device 170.

Figure 6:
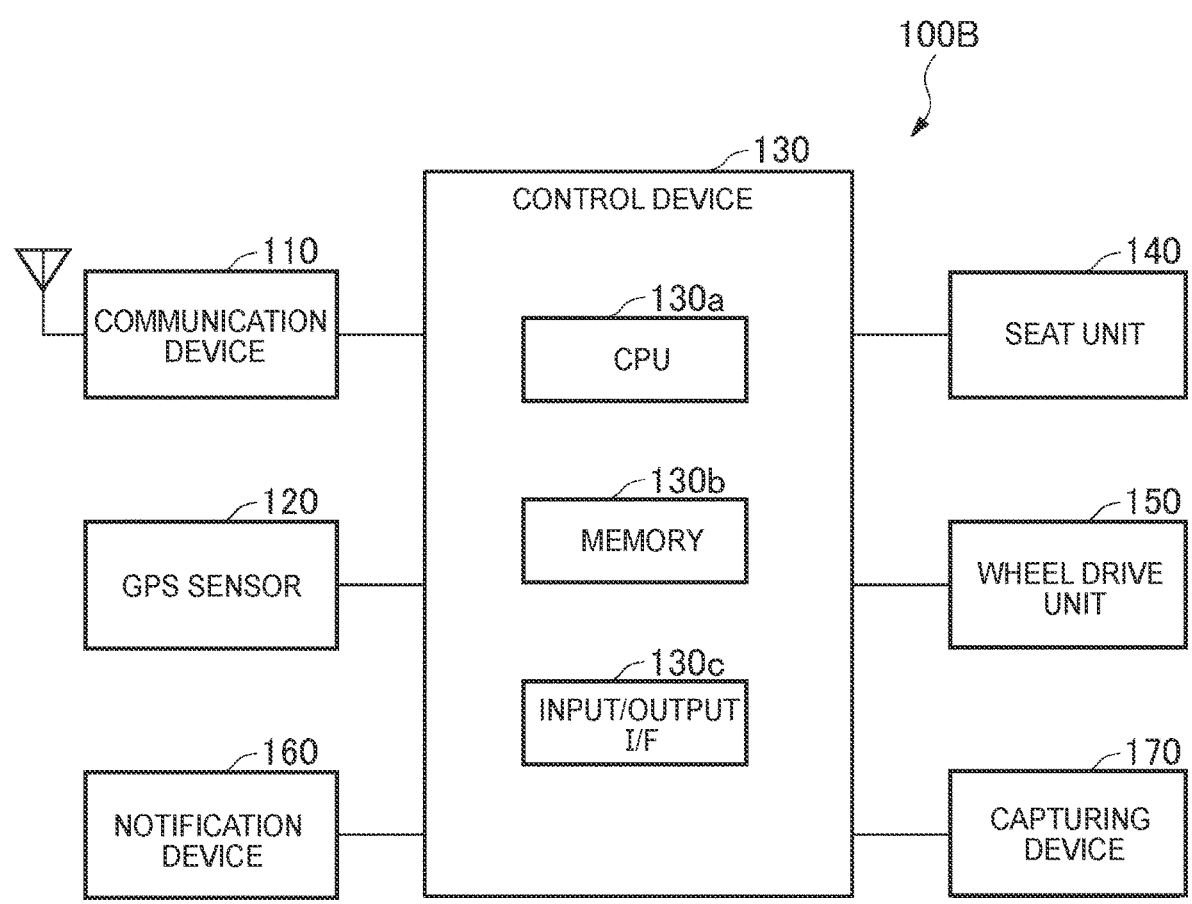
FIG. 6 is a block diagram showing a general system configuration of the personal mobile unit 100B according to this embodiment.

FIG. 6 is a block diagram showing a general system configuration of the personal mobile unit 100B according to this embodiment. The personal mobile unit 100B according to this embodiment includes a pair of wheel drive units 150 that drives the drive wheels 104, the seat unit 140 where an occupant can sit, a communication device 110 that enables communication with an external device, the operation unit 115 that enables an occupant to perform the driving operation, a GPS sensor 120 that acquires position information, a notification device 160 that can output a sound, and an capturing device 170 that captures an image.

The GPS sensor 120 acquires the current position information on the personal mobile unit 100B. The GPS sensor 120 is, for example, a part of a position information measurement system that uses artificial satellites. The GPS sensor 120 receives radio waves from several GPS satellites to accurately measure a position (longitude, latitude, altitude) at any point on the earth.

The control device 130 generates and outputs the control signal for controlling the driving of the wheel drive units 150 based on the detection values output from various sensors mounted on the personal mobile unit 100B and based on the operation by an occupant using the operation unit 115.

The control device 130 includes a CPU 130a, a memory 130b, and the input/output I/F 130c to implement various types of processing. The CPU 130a executes the functions and/or methods implemented by code or instructions included in the programs stored in the memory 130b.

The memory 130b stores programs and provides a work area to the CPU 130a. In addition, the memory 130b temporarily stores various types of data generated while the CPU 130a executes a program. The memory 130b includes, for example, a random access memory (RAM) and a read only memory (ROM).

The input/output I/F 130c includes an input device and an output device. The input device is a device on which various types of input operation for the control device 130 are performed. The output device is a device on which the processing result processed by the control device 130 and the processing result processed by the information processing device 200 are output. In the input/output I/F 130c, the input device and the output device may be provided integrally or separately, and one or more input devices and one or more output devices may be provided. The input/output I/F 130c may be provided integrally with, or separately from, the CPU 130a or the memory 130b.

The input device is not limited to a particular device, but any of various types of device may be used as long as the device can send the input information, entered via an input operation by an occupant (driver) of the small vehicle 100B, to the CPU 130a. The input device may be one type of device or a combination of two or more types of devices. More specifically, the input device may be a touch panel, a touch display, a keyboard, a pointing device such as a mouse, a camera (an image input device that may also be used as a capturing device), or a microphone (a voice input device).

The output device is not limited to a particular device, but any of various types of device may be used as long as the device can output processing results produced by the control device 130 and the processing device 200. The processing results mentioned above include the video or sound of content (moving image, movie, other video-sound works) to be provided to the users (audience) in the entertainment system 1. The output device may be one type of device or a combination of two or more types of devices. More specifically, the output device may be a touch panel, a touch display, a monitor (liquid crystal display, organic EL display, head mounted display, hologram, projection mapping), a speaker (voice output device), a 2D printer (character output device), or a 3D printer (modeling output device). The output device may be installed, for example, on the front or side of the vehicle body 2 as shown in the figure or may be provided independently of the vehicle body 2.

The seat unit 140 is a seat unit on which an occupant can sit and may have a reclining structure.

The wheel drive units 150, built in the vehicle body 102, drive a pair of left and right drive wheels 104 or one drive wheel 104 at the rear.

The notification device 160 is an example of a unit for notification. The notification device 160 notifies an occupant or a person outside the vehicle in response to the notification signal from the control device 130. The notification device 160 is configured, for example, by a speaker that outputs a sound. The input/output I/F 130c may function as the notification device 160.

The capturing device 170 is provided, for example, in a position to capture the area in front of the personal mobile unit 100B. The capturing device 170 outputs a captured image, obtained by capturing the area in front of the personal mobile unit 100B, to the control device 130.

First Example

Figure 7:
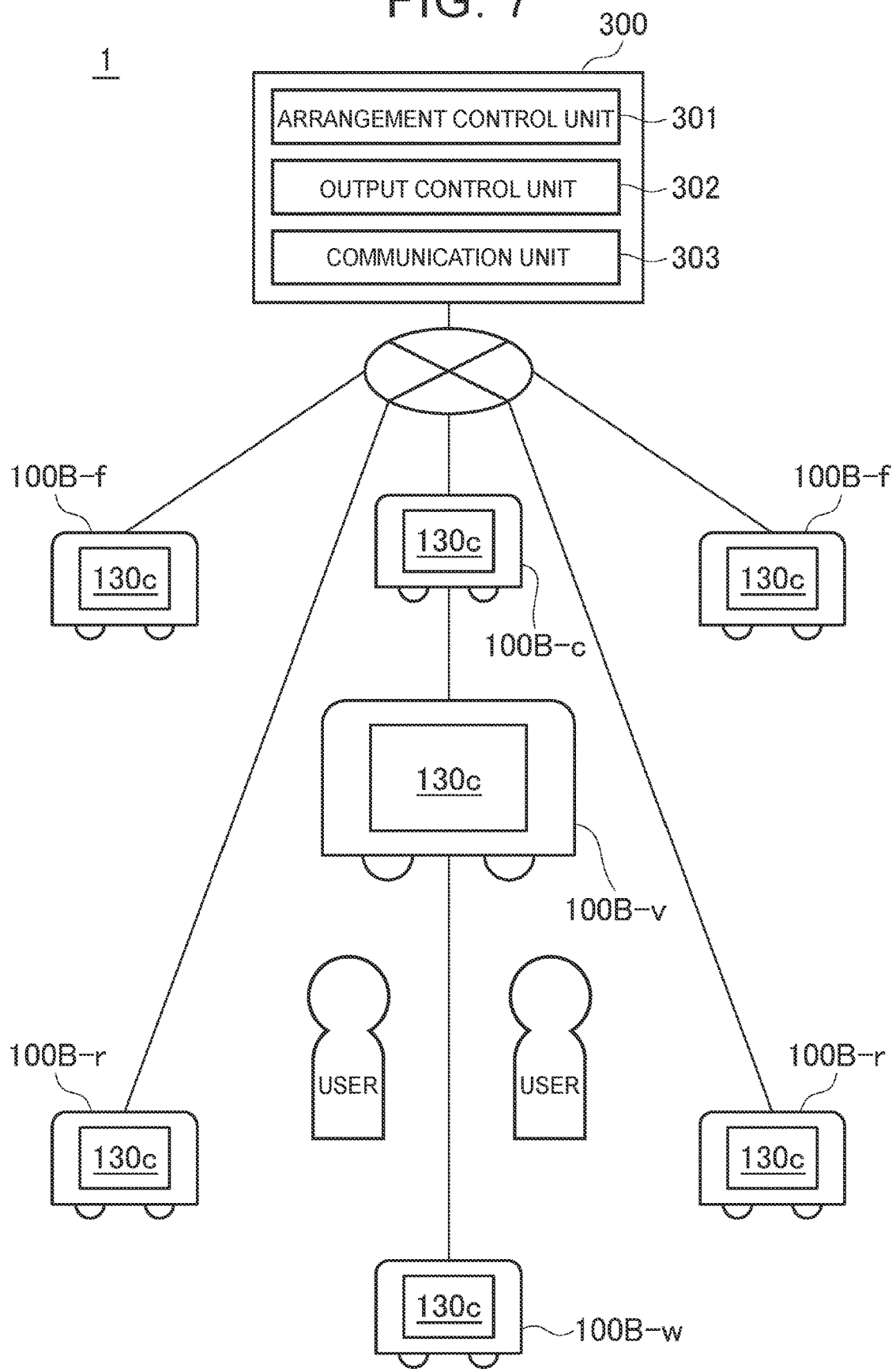
FIG. 7 is a diagram showing an overall general configuration of an example of an entertainment system according to this embodiment.

FIG. 7 is a diagram showing an overall general configuration of an example of an entertainment system constructed by a plurality of personal mobile units 100B (each of these personal mobile units 100B is an example of the small vehicle 100 in this embodiment), the information processing device 200, and the master device 300. FIG. 7 includes in part a functional block diagram. The entertainment system 1 in this example includes at least a plurality of personal mobile units 100B and the functional units including an arrangement control unit 301, an output control unit 302, and a communication unit 303. This configuration allows the entertainment system 1 to reproduce and deliver various types of content, such as moving images, movies, music, and other sources of video-sound works, for provision to the users (audience).

The functional units (arrangement control unit 301, output control unit 302, and communication unit 303) are implemented by the cooperation of the processor 202, memory 204, storage 206, input/output I/F 208, and communication I/F 210 included in the master device 300. That is, the processor 202 of the above-described master device 300, shown in FIG. 2, expands various programs into the memory 204 (for example, RAM). These various programs, stored in the storage 206, are programs necessary for the construction and operation of the entertainment system 1. Then, the processor 202 interprets and executes these various programs expanded in the memory 204 and, by controlling the hardware components, implements each of the functional units. The functions implemented by the master device 300 may be implemented by the processor 202 such as a general-purpose CPU, or a part or all of the functions may be implemented by one or more dedicated processors 202.

The entertainment system 1 in this example is a mini-theater system that uses a surround-sound system having a 5.1-channel speaker configuration. In the entertainment system 1 in this example, it is assumed that there are seven personal mobile units 100B. To each of these seven personal mobile units 100B, the arrangement control unit 301 of the master device 300 sends the arrangement command signal, which indicates the position where the personal mobile units 100B is to be arranged, via the communication unit 303. In response to this arrangement command, the control device 130 of each of the personal mobile units 100B moves the personal mobile unit 100B to a predetermined position. As a result, the seven personal mobile units 100B are arranged in the positions around the users (audience) as shown in FIG. 7.

At this time, based on the two-dimensional or three-dimensional position data included in the arrangement command and the GPS position information at that time or based on the coordinate information that is included in the arrangement command and that indicates a position relative to another personal mobile 100B, the control device 130 of each of the personal mobile units 100B moves the personal mobile unit 100B to its arrangement position either autonomously or by occupant's driving.

Next, the output control unit 302 of the master device 300 sends the video and sound signals of content, which is to be output from each of the personal mobile vehicles 100B, to each of the personal mobile units 100B via the communication unit 303. Then, the received video and sound signals are reproduced via the input/output I/F 130c of the personal mobile units 100B.

According to the entertainment system 1 configured in this way, the arrangement control unit 301 of the master device 300 controls the arrangement of a plurality of personal mobile units 100B each having the input/output I/F 130c that is the output device of the video and sound of content, and the output control unit 302 controls the video and sound of content to be output from each of the personal mobile units 100B based on the arrangement of the plurality of personal mobile units 100B. Then, the content can be reproduced and delivered for provision to the users (audience). In providing the content in this way, the use of the small vehicles 100, such as the personal mobile units 100B, allows the system to be simply and flexibly constructed. In addition, the use of the battery provided in the small vehicle 100, such as the personal mobile unit 100B, as the power supply of the input/output I/F 130c, which functions as the output device, allows the power supply to be secured easily. As a result, it is possible to implement a versatile entertainment system 1 that is not easily subject to the installation condition restrictions such as the installation place and the installation period.

Second Example

The arrangement control unit 301 of the master device 300 may freely determine the arrangement of a plurality of personal mobile units 100B. Alternatively, with the initial positions of the personal mobile units 100B (the positions of the personal mobile units 100B before constructing the entertainment system 1) acquired in advance, the arrangement control unit 301 of the master device 300 may perform matching between the relative arrangement layout of the personal mobile units 100B at their initial positions and a predetermined layout such as the one shown in FIG. 7 and, then, optimize the arrangement so that the travel distances of the personal mobile units 100B are minimized. In this way, based on the initial positions of the plurality of personal mobile units 100B, the arrangement control unit 301 determines the arrangement of the plurality of personal mobile units 100B for outputting the video and/or sound of content. Determining the arrangement of the plurality of personal mobile units 100B in this way allows the entertainment system 1 to be constructed more quickly and reliably.

Third Example

The arrangement control unit 301 of the master device 300 may set up a mini-theater system that uses a surround-sound system having a 5.1-channel speaker configuration, such as the one shown in FIG. 7, as the standard form of the entertainment system 1. Alternatively, the arrangement control unit 301 of the master device 300 may select such a configuration only when the video and sound sources of content, which is to be provided, conform to such a 5.1-channel speaker configuration (see also the sixth example described later). In this way, based on the mode of the video and/or sound of content, the arrangement control unit 301 determines the arrangement of the plurality of personal mobile units 100B for outputting the video and/or sound of the content. Determining the arrangement of the plurality of personal mobile units 100B in this way allows the construction of the entertainment system 1 that is more realistic, making it easier to satisfy the interest of the users (audience).

Fourth Example

The output control unit 302 of the master device 300 may reproduce and output appropriate video and sound using any personal mobile units 100B regardless of the arrangement of a plurality of personal mobile units 100B or regardless of the mode of the video and/or sound of content. Alternatively, the output control unit 302 of the master device 300 may determine the roles of the personal mobile units 100B in the entertainment system 1 based on the arrangement of a plurality of personal mobile units 100B such as the arrangement shown in FIG. 7 or based on the mode of the video and/or sound of content to be provided in that arrangement.

For example, the example of the arrangement shown in FIG. 7 corresponds to a surround-sound system having a 5.1-channel speaker configuration. Therefore, when the video and sound formats of the content to be provided conform to such a system, the output control unit 302 of the master device 300 may determine the personal mobile units 100B for outputting the video of the content and the personal mobile units 100B for outputting the sound of the content as described below.

That is, the output control unit 302 of the master device 300 causes the seven personal mobile units 100B, shown in FIG. 7, to function as follows. The one personal mobile unit 100B-v arranged in front of the users functions as a video reproduction monitor. The two personal mobile units 100B-f arranged apart in front of the users function as 2-channel front speakers for stereo sound reproduction, and the one personal mobile unit 100B-c arranged between them functions as a 1-channel center speaker to enable the user to clearly hear the lyrics of songs or dialogues of dramas. Furthermore, the two personal mobile units 100B-r arranged apart in the rear of the users function as 2-channel rear speakers for enhancing stereophonic sound, and the one personal mobile unit 100B-w arranged between them functions as a 0.1-channel subwoofer speaker for bass reproduction. This configuration allows a mini-theater system, suitable for content having the video and sound formats conforming to the 5.1-channel speaker configuration, to be implemented more preferably and reliably.

Fifth Example

Figure 8:
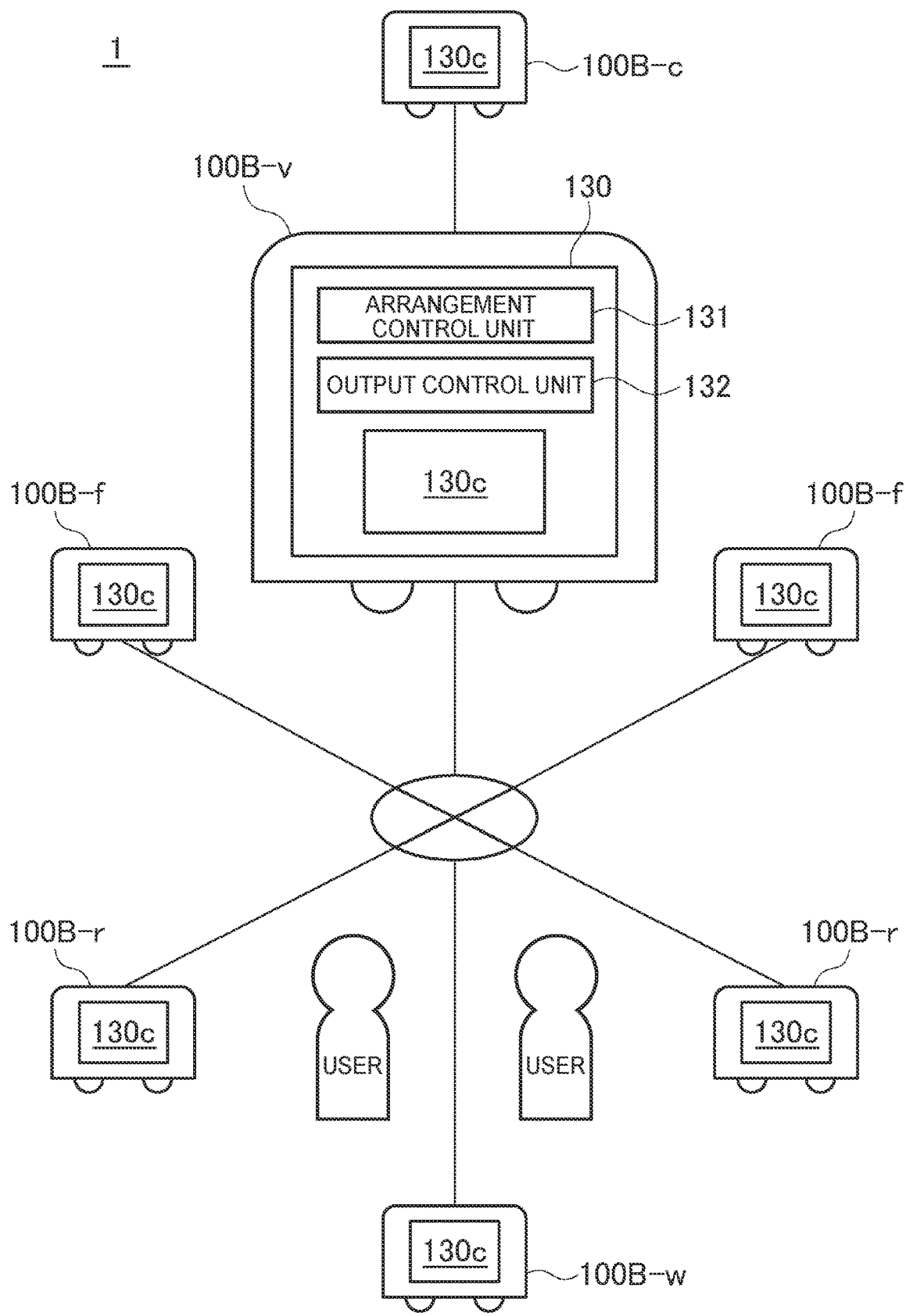
FIG. 8 is a diagram showing an overall general configuration of another example of the entertainment system according to this embodiment.

FIG. 8 is a diagram showing an overall general configuration of another example of an entertainment system constructed by a plurality of personal mobile units 100B (each of these personal mobile units 100B is an example of the small vehicle 100 in this embodiment), the information processing device 200, and the master device 300. FIG. 8 includes in part a functional block diagram. The entertainment system 1 in this example is similar in configuration to the entertainment system 1 shown in FIG. 7 except that the master device 300 is replaced by an arrangement control unit 131 and an output control unit 132 of the control device 130 included in one of the plurality of personal mobile units 100B.

That is, the functional units such as the arrangement control unit 131 and the output control unit 132 are implemented by the cooperation of the CPU 130a and the memory 130b provided in the personal mobile unit 100B-v that is arranged in front of the users to function as a video reproduction monitor. In this case, the CPU 130a of the personal mobile unit 100B, shown in FIG. 6, expands various programs into the memory 130b (for example, RAM). These various programs, which are stored in the storage 206 of the information processing device 200 and the master device 300, are programs necessary for the construction and the operation of the entertainment system 1. After that, the CPU 130a interprets and executes the various programs, which have been expanded in the memory 130b, to control the hardware components, thereby implementing the functional units. Note that the functions implemented by the control device 130 of the personal mobile unit 100B may be implemented by a general-purpose CPU 130a or that the functions may be implemented, in part or in whole, by one or more dedicated CPUs 130a.

Also in the entertainment system 1 configured in this way, the use of the small vehicles 100 such as the personal mobile units 100B allows the system to be simply and flexibly constructed. In addition, the use of the battery provided in the small vehicle 100, such as the personal mobile unit 100B, as the power supply of the input/output I/F 130c, which functions as the output device, allows the power supply to be secured easily. As a result, it is possible to implement a versatile entertainment system 1 that is not easily subject to the installation condition restrictions such as the installation place and the installation period. In addition, the personal mobile unit 100B itself controls the arrangement control unit 131 and the output control unit 132 without using the master device 300, allowing the hardware resources to be used more effectively.

Sixth Example

Figure 9:
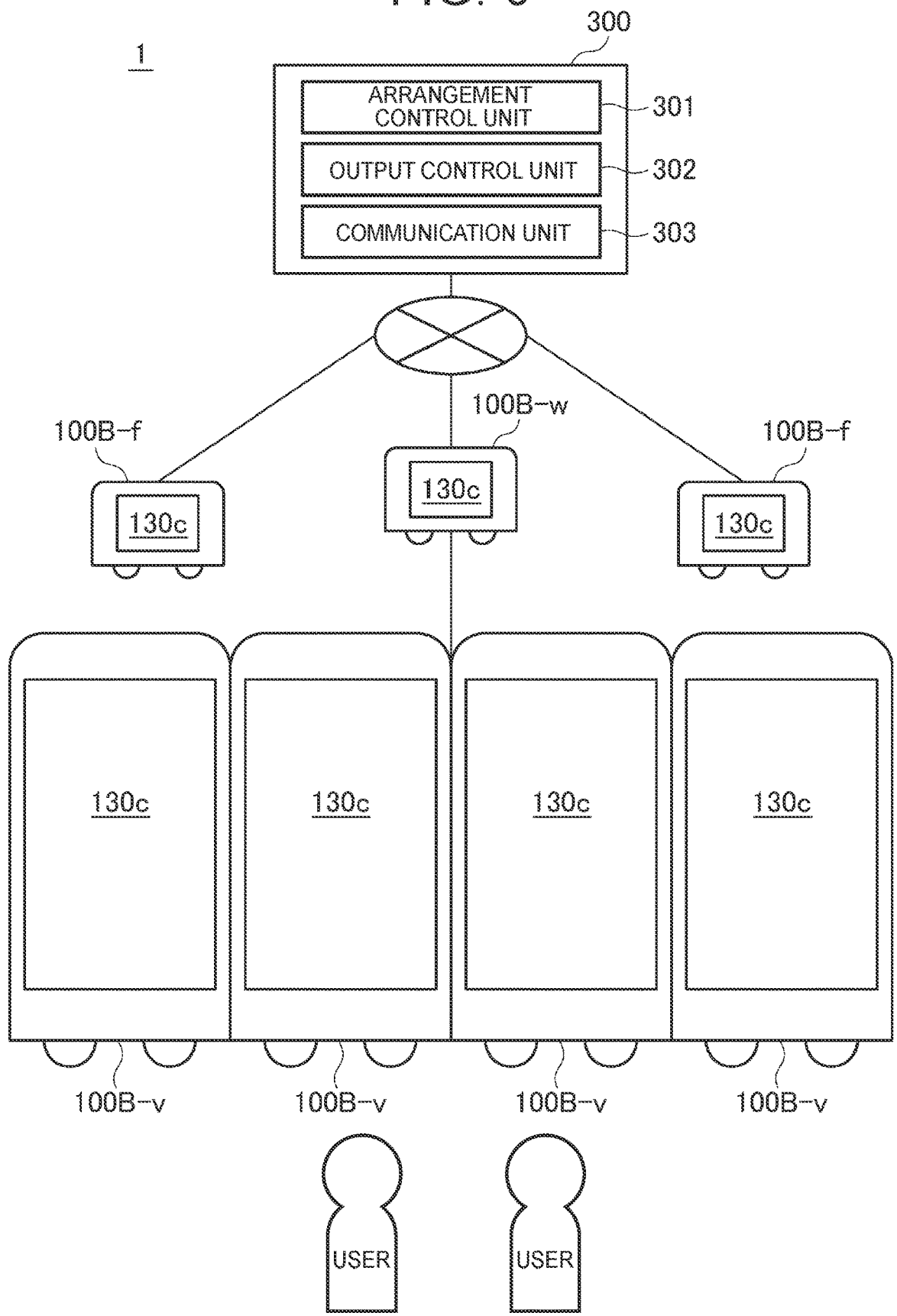
FIG. 9 is a diagram showing an overall general configuration of still another example of the entertainment system according to this embodiment.

FIG. 9 is a diagram showing an overall general configuration of still another example of an entertainment system constructed by a plurality of personal mobile units 100B (each of these personal mobile units 100B is an example of the small vehicle 100 in this embodiment), the information processing device 200, and the master device 300. FIG. 9 includes in part a functional block diagram. The entertainment system 1 in this example is similar in configuration to the entertainment system 1 shown in FIG. 7 except that a mini-theater system is configured in which the surround-sound system having a 5.1-channel speaker configuration shown in FIG. 7 is replaced by a surround-sound system having a 2.1-channel speaker configuration and that a plurality of personal mobile units 100B-v, which function as a video reproduction monitor, are provided.

That is, the output control unit 302 of the master device 300 causes the seven personal mobile units 100B, shown in FIG. 9, to function as follows. The four personal mobile units 100B-v arranged in front of the users function as a video reproduction monitor. The video of the content is divided into four sections that are projected, one section on each personal mobile unit 100B-v, for integrated display. This integrated display makes it is easy to provide powerful video with a larger angle of view. In addition, the two personal mobile units 100B-f arranged apart in front of the users function as the 2-channel front speakers for stereo sound reproduction, and the one personal mobile unit 100B-w arranged between them functions as a 0.1-channel subwoofer speaker for bass reproduction. This configuration allows a mini-theater system, suitable for content having video and sound formats conforming to the 2.1-channel speaker configuration, to be implemented more preferably and reliably.

While the above embodiment and above examples have been described in detail as an example of the present disclosure, the present disclosure is not limited to the above embodiment and the already described modifications but various modifications are possible without changing the spirit of the present disclosure. The above embodiment and above examples may be partially replaced or appropriately combined and, in addition, the changes described as appropriate in the embodiments and examples may be added.

For example, the arrangement control unit 301, the output control unit 302, and the communication unit 303 implemented by the master device 300 in the entertainment system 1 shown in FIG. 7 and FIG. 9 may be implemented by the information processing device 200. Similarly, the arrangement control unit 131 and the output control unit 132 implemented by the personal mobile unit 100B in the entertainment system 1 shown in FIG. 8 may be implemented by the information processing device 200. In addition, the entertainment system 1 is not limited to a mini-theater system using a surround-sound system having a 2.1-channel or 5.1-channel speaker configuration. For example, the entertainment system 1 may be constructed as a mini-theater system using a surround-sound system having a 7.1-channel speaker configuration. Furthermore, the small vehicle 100 dedicated to power supply may be incorporated to construct the entertainment system 1. Furthermore, the entertainment system 1 may be used as an information providing system in an emergency situation such as a disaster or as an amusement system.

The entertainment system and the program of the present disclosure can be broadly and effectively applicable to the software and hardware related technologies in general such as the reproduction, delivery, provision, and implementation of the video and sound of content and to the activities such as the design, production, sales, and popularization of those technologies.

What is claimed is:

1. An entertainment system comprising:
a plurality of mobile units each of which has an output device for outputting a video or a sound of content, wherein:
the plurality of mobile units are mobility vehicles, and
the plurality of mobile units includes a first mobile unit and a plurality of second mobile units; and
a processor configured to:
control an arrangement location of the plurality of mobile units; and
control the video or the sound of the content based on the arrangement location of the plurality of mobile units, the video or the sound being output from each of the plurality of mobile units,
wherein the processor is configured to control the first mobile unit to output the video of the content and to control the arrangement location of the plurality of second mobile units in order to surround the first mobile unit and to separately output the sound of the content being output by the first mobile unit.

2. The entertainment system according to claim 1, wherein
the processor is configured to determine the arrangement location of the plurality of mobile units for use when outputting the video or the sound of the content, based on an initial position of each of the plurality of mobile units.

3. The entertainment system according to claim 1, wherein
the processor is configured to determine the arrangement location of the plurality of mobile units for use when outputting the video or the sound of the content, based on a mode of the video or the sound of the content.

4. The entertainment system according to claim 1, wherein
the processor is configured to determine mobile units for outputting the video of the content or mobile units for outputting the sound of the content, based on the arrangement location of the plurality of mobile units.

5. The entertainment system according to claim 1, wherein
the processor is configured to determine mobile units for outputting the video of the content or mobile units for outputting the sound of the content, based on the mode of the video or the sound of the content.

6. The entertainment system according to claim 1, wherein
the processor is provided in at least one of the plurality of mobile units or in a device other than the plurality of mobile units.

7. The entertainment system according to claim 1, wherein
the first mobile unit includes only a single first mobile unit;
wherein only the first mobile unit outputs the video of the content.

8. The entertainment system according to claim 1, wherein
the first mobile unit includes a plurality of first mobile units;
wherein only the plurality of first mobile units outputs the video of the content.

9. A non-transitory storage medium that includes control logic, which when executed, causes an information processing device to
control an arrangement location of a plurality of mobile units each of which has an output device for outputting a video or a sound of content, wherein the plurality of mobile units are mobility vehicles and the plurality of mobile units includes a first mobile unit and a plurality of second mobile units; and
control the video or the sound of the content that is output from each of the plurality of mobile units, based on the arrangement location of the plurality of mobile units,
wherein the first mobile unit is controlled to output the video of the content and the plurality of second mobile units is controlled in order to control the arrangement location of the plurality of second mobile units in order to surround the first mobile unit and to separately output the sound of the content being output by the first mobile unit.

* * * * *